(12) United States Patent
Xu et al.

(10) Patent No.: US 11,768,569 B2
(45) Date of Patent: Sep. 26, 2023

(54) TOUCH SUBSTRATE AND METHOD OF FORMING THE SAME, AND TOUCH DISPLAY DEVICE

(71) Applicants: HEFEI XINSHENG OPTOELECTRONICS TECHNOLOGY CO., LTD., Anhui (CN); BOE TECHNOLOGY GROUP CO., LTD., Beijing (CN)

(72) Inventors: Zouming Xu, Beijing (CN); Xiaofeng Yin, Beijing (CN); Tsungchieh Kuo, Beijing (CN); Jian Tian, Beijing (CN); Chunjian Liu, Beijing (CN)

(73) Assignees: HEFEI XINSHENG OPTOELECTRONICS TECHNOLOGY CO., LTD., Anhui (CN); BOE TECHNOLOGY GROUP CO., LTD., Beijing (CN)

( * ) Notice: Subject to any disclaimer, the term of this patent is extended or adjusted under 35 U.S.C. 154(b) by 197 days.

(21) Appl. No.: 17/413,407

(22) PCT Filed: Aug. 27, 2020

(86) PCT No.: PCT/CN2020/111786
§ 371 (c)(1),
(2) Date: Jun. 11, 2021

(87) PCT Pub. No.: WO2022/041057
PCT Pub. Date: Mar. 3, 2022

(65) Prior Publication Data
US 2022/0317813 A1    Oct. 6, 2022

(51) Int. Cl.
G06F 3/044 (2006.01)
G02F 1/1333 (2006.01)
G06F 3/041 (2006.01)

(52) U.S. Cl.
CPC ........ *G06F 3/0446* (2019.05); *G02F 1/13338* (2013.01); *G06F 3/0412* (2013.01);
(Continued)

(58) Field of Classification Search
CPC ....... G06F 3/04164; G06F 2203/04111; G06F 3/041–047; G06F 2203/041–04114;
(Continued)

(56) References Cited

U.S. PATENT DOCUMENTS

| 2013/0043068 | A1* | 2/2013 | Xie | G06F 3/0443 174/250 |
| 2013/0270079 | A1* | 10/2013 | Xie | G06F 3/0446 200/305 |

(Continued)

FOREIGN PATENT DOCUMENTS

| CN | 103472944 A | 12/2013 |
| CN | 103500036 A | 1/2014 |

(Continued)

*Primary Examiner* — Sanjiv D. Patel
(74) *Attorney, Agent, or Firm* — BROOKS KUSHMAN P.C.

(57) ABSTRACT

A touch substrate and a method of forming the same, and a touch display device are provided. The touch substrate includes: electrode connecting bridges, a signal wiring layer, an insulating layer and a touch electrode layer which are sequentially formed along a direction away from a base, where the touch electrode layer includes a plurality of first touch electrodes and a plurality of second touch electrodes, and the first touch electrodes and the second touch electrodes are arranged in a crossed manner.

12 Claims, 10 Drawing Sheets

(52) U.S. Cl.
CPC .. *G06F 3/0443* (2019.05); *G06F 2203/04103* (2013.01); *G06F 2203/04111* (2013.01)

(58) Field of Classification Search
CPC ......... G06F 2203/04017; G06F 3/0412; G06F 3/0443; G06F 3/0446; G06F 3/044; G02F 1/13338
See application file for complete search history.

(56) References Cited

U.S. PATENT DOCUMENTS

| | | |
|---|---|---|
| 2014/0267953 A1 | 9/2014 | Kim et al. |
| 2015/0009422 A1 | 1/2015 | Tung |
| 2015/0103266 A1 | 4/2015 | Hao et al. |
| 2016/0041644 A1* | 2/2016 | Bae ................ G06F 3/0443 216/13 |
| 2016/0299594 A1* | 10/2016 | Zhang ............... G06F 3/0443 |
| 2017/0308201 A1 | 10/2017 | Xie et al. |
| 2019/0196615 A1 | 6/2019 | Chen et al. |
| 2020/0081568 A1* | 3/2020 | Xu ................ H10K 59/131 |
| 2021/0165526 A1 | 6/2021 | Fan et al. |

FOREIGN PATENT DOCUMENTS

| | | |
|---|---|---|
| CN | 103995612 A | 8/2014 |
| CN | 105159515 A | 12/2015 |
| CN | 106843616 A | 6/2017 |
| CN | 107463031 A | 12/2017 |
| CN | 109960434 A | 7/2019 |
| CN | 211124000 U | 7/2020 |
| WO | 2012047013 A2 | 4/2012 |

* cited by examiner

TOUCH SUBSTRATE AND METHOD OF FORMING THE SAME, AND TOUCH DISPLAY DEVICE

CROSS-REFERENCE TO RELATED APPLICATION

This application is the U.S. national phase of PCT Application No. PCT/CN2020/111786 filed on Aug. 27, 2020, which is incorporated herein by reference in its entirety.

TECHNICAL FIELD

The present disclosure relates to the technical field of touch display, in particular to a touch substrate and a method of forming the same, and a touch display device.

BACKGROUND

A Multi-Layer On-Cell (MLOC) structure, i.e. a multi-layer On-Cell structure, refers to a structure in which a touch substrate is embedded between a liquid crystal display panel and a polarizer, and this structure can realize touch-display integration. The current touch substrate includes driving electrodes and sensing electrodes, when the touch substrate works, driving signals are provided for the driving electrodes, sensing signals on all the sensing electrodes are sensed at the same time, and a specific position where touch occurs is judged according to the sensed sensing signals.

SUMMARY

The present disclosure aims to provide a touch substrate and a manufacturing method thereof, and a touch display device.

A first aspect of the present disclosure provides a touch substrate including: a base;
a plurality of electrode connecting bridges arranged on the base, where the plurality of electrode connecting bridges are arranged in an array form;
a signal wiring layer arranged at a side, away from the base, of the electrode connecting bridge, where the signal wiring layer includes a plurality of first signal wires and a plurality of second signal wires;
an insulating layer arranged at a side, away from the base, of the signal wiring layer, where the insulating layer includes first insulating patterns being in one-to-one correspondence with the electrode connecting bridges and a second insulating pattern covering the signal wiring layer; and
a touch electrode layer arranged at a side, away from the base, of the insulating layer, where the touch electrode layer includes a plurality of first touch electrodes and a plurality of second touch electrodes, and the first touch electrodes and the second touch electrodes are arranged in a crossed manner; the first signal wires are electrically connected with the first touch electrodes in a one-to-one correspondence manner, and the second signal wires are electrically connected with the second touch electrodes in a one-to-one correspondence manner; an orthographic projection of the first touch electrode onto the base and an orthographic projection of the electrode connecting bridge onto the base have a first overlapping area, and the first insulating patterns cover the first overlapping areas in a one-to-one correspondence manner; each second touch electrode includes a plurality of electrode patterns which are arranged at intervals, and adjacent electrode patterns in the plurality of electrode patterns are electrically connected through the electrode connecting bridge.

Optionally, the touch substrate further includes:
a plurality of binding pins, where a first part of binding pins in the plurality of binding pins are electrically connected with the first signal wires in a one-to-one correspondence manner, and a second part of binding pins in the binding pins are electrically connected with the second signal wires in a one-to-one correspondence manner;
the binding pin includes a first binding pattern, a second binding pattern and a third binding pattern which are sequentially stacked along a direction away from the base, the first binding pattern and the electrode connecting bridge are arranged on the same layer and are made of the same material, and the second binding pattern and the corresponding electrically connected first signal wire or second signal wire form an integrated structure, and the third binding pattern and the touch electrode layer are arranged on the same layer and are made of the same material.

Optionally, the orthographic projection of the first touch electrode onto the base and an orthographic projection of a lap joint end of the corresponding first signal wire onto the base have a second overlapping area, first through hole structures being in one-to-one correspondence with the second overlapping areas are arranged on the second insulating pattern, the first through hole structure includes a plurality of first through holes, and the first touch electrode is electrically connected with the lap joint end of the corresponding first signal wire through the plurality of first through holes in the corresponding first through hole structure; and/or,
an orthographic projection of the second touch electrode onto the base and an orthographic projection of an lap joint end of the corresponding second signal wire onto the base have a third overlapping area, second through hole structures being in one-to-one correspondence with the third overlapping areas are arranged on the second insulating pattern, the second through hole structure includes a plurality of second through holes, and the second touch electrode is electrically connected with the lap joint end of the corresponding second signal wire through the plurality of second through holes in the corresponding second through hole structure.

Optionally, orthographic projections of the plurality of first through holes onto the base are located inside the orthographic projection of the lap joint end of the first signal wire onto the base; and/or,
orthographic projections of the plurality of second through holes onto the base are located inside the orthographic projection of the lap joint end of the second signal wire onto the base.

Optionally, the touch substrate further includes:
a passivation layer located at a side, away from the base, of the touch electrode layer, where the passivation layer exposes the plurality of binding pins of the touch substrate.

Optionally, the signal wiring layer further includes: a signal isolation line, where the plurality of first signal wires are located on a first side of the signal isolation line, and the plurality of second signal wires are located on a second side of the signal isolation line.

Based on the technical solutions of the above-mentioned touch substrate, a second aspect of the present disclosure provides a touch display device which includes the above-mentioned touch substrate.

Optionally, the touch display device further includes a display panel, where the display panel includes an array substrate and a color film substrate which are arranged oppositely, and a liquid crystal layer arranged between the array substrate and the color film substrate; and the color film substrate is reused as the base in the touch substrate.

Optionally, the touch display device further includes a display panel, where the display panel and the touch substrate are stacked, and the touch electrode layer in the touch substrate is located between the display panel and the base of the touch substrate.

Based on the technical solutions of the above-mentioned touch substrate, a third aspect of the present disclosure provides a method of forming a touch substrate, which is used for manufacturing the above-mentioned touch substrate, and the manufacturing method includes:

manufacturing a plurality of electrode connecting bridges on a base, where the electrode connecting bridges are arranged in an array form;

manufacturing a signal wiring layer at a side, away from the base, of the electrode connecting bridge, where the signal wiring layer includes a plurality of first signal wires and a plurality of second signal wires;

manufacturing an insulating layer at a side, away from the base, of the signal wiring layer, where the insulating layer includes first insulating patterns being in one-to-one correspondence with the electrode connecting bridges and a second insulating pattern covering the signal wiring layer; and manufacturing a touch electrode layer at a side, away from the base, of the insulating layer, where the touch electrode layer includes a plurality of first touch electrodes and a plurality of second touch electrodes, and the first touch electrodes and the second touch electrodes are arranged in a crossed manner; the first signal wires are electrically connected with the first touch electrodes in a one-to-one correspondence manner, and the second signal wires are electrically connected with the second touch electrodes in a one-to-one correspondence manner; an orthographic projection of the first touch electrode onto the base and an orthographic projection of the electrode connecting bridge onto the base have a first overlapping area, and the first insulating patterns cover the first overlapping areas in a one-to-one correspondence manner; each second touch electrode includes a plurality of electrode patterns which are arranged at intervals, and adjacent electrode patterns in the plurality of electrode patterns are electrically connected through the electrode connecting bridge.

Optionally, the manufacturing method further includes:
manufacturing a plurality of binding pins, where a first part of the binding pins in the plurality of binding pins are electrically connected with the first signal wires in a one-to-one correspondence manner, and a second part of the binding pins in the binding pins are electrically connected with the second signal wires in a one-to-one correspondence manner; and the binding pin includes a first binding pattern, a second binding pattern and a third binding pattern which are sequentially stacked along a direction away from the base;

The manufacturing the plurality of binding pins specifically includes the following steps:

simultaneously forming the first binding pattern and the electrode connecting bridges through one patterning process;

simultaneously forming the second binding pattern and the signal wiring layer of an integrated structure through one patterning process; and simultaneously forming the third binding pattern and the touch electrode layer through one patterning process.

Optionally, the manufacturing the insulating layer on the side, away from the base, of the signal wiring layer specifically includes the following steps:

forming an insulating film on the side, away from the base, of the signal wiring layer; and patterning the insulating film to form the first insulating pattern and the second insulating pattern; the orthographic projection of the first touch electrode onto the base and an orthographic projection of an lap joint end of the corresponding first signal wire onto the base have a second overlapping area, first through hole structures being in one-to-one correspondence with the second overlapping areas are arranged on the second insulating pattern, the first through hole structure includes a plurality of first through holes, and the first touch electrode is electrically connected with the lap joint end of the corresponding first signal wire through the plurality of first through holes in the corresponding first through hole structure; an orthographic projection of the second touch electrode onto the base and an orthographic projection of an lap joint end of the corresponding second signal wire onto the base have a third overlapping area, second through hole structures being in one-to-one correspondence with the third overlapping areas are arranged on the second insulating pattern, the second through hole structure includes a plurality of second through holes, and the second touch electrode is electrically connected with the lap joint end of the corresponding second signal wire through the plurality of second through holes in the corresponding second through hole structure.

Optionally, the manufacturing method further includes:
manufacturing a passivation layer at a side, away from the base, of the touch electrode layer, where the passivation layer exposes the plurality of binding pins of the touch substrate.

Optionally, the manufacturing method further includes:
simultaneously forming a signal isolation line, the plurality of first signal wires and the plurality of second signal wires through one patterning process, where the plurality of first signal wires are located on a first side of the signal isolation line, and the plurality of second signal wires are located on a second side of the signal isolation line.

BRIEF DESCRIPTION OF THE DRAWINGS

The accompanying drawings, which are included to provide a further understanding of the present disclosure and are incorporated in and constitute a part of the present disclosure, illustrate embodiments of the present disclosure and together with the description serve to explain the present disclosure and do not constitute an undue limitation on the present disclosure. In the drawings.

DETAILED DESCRIPTION

Figure 1:
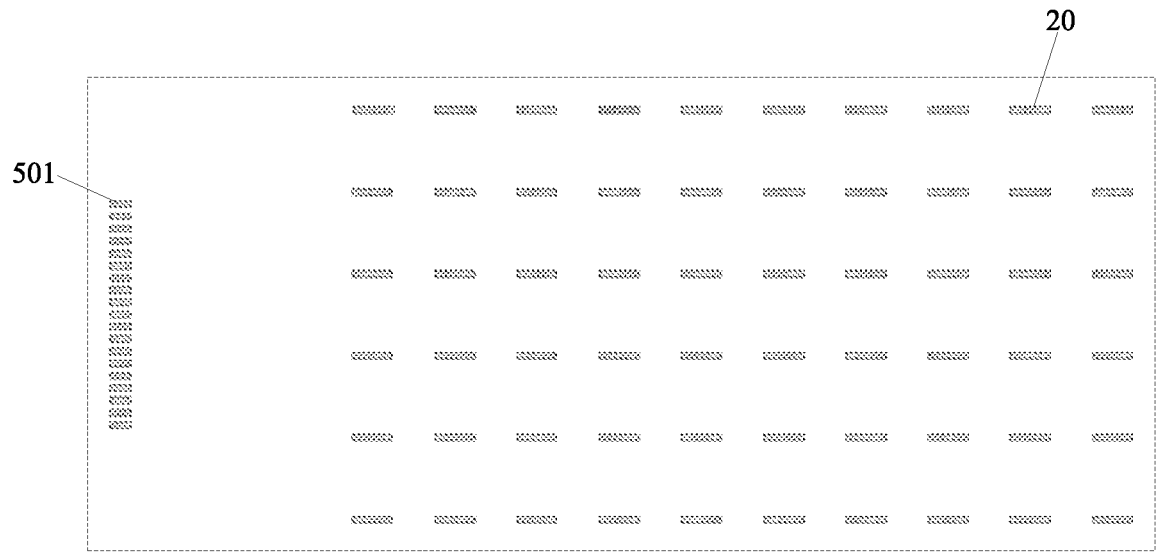
FIG. 1 is a schematic diagram of manufacturing electrode connecting bridges on a base provided by the present disclosure.

In order to further explain the touch substrate and the manufacturing method thereof, and the touch display device provided by the embodiments of the present disclosure, the detailed description is given below with reference to the accompanying drawings of the description.

As shown in FIGS. 1-6, the present disclosure provides a touch substrate, and the touch substrate includes: a base 10, a plurality of electrode connecting bridges 20 arranged on the base 10, a first insulating layer (including a first insulating pattern 41) arranged at a side, away from the base 10, of the plurality of electrode connecting bridges 20, and a touch electrode layer (including a first touch electrode 71 and a second touch electrode 72) arranged at a side, away from the base 10, of the first insulating layer, a metal wiring layer 36 (including a first signal wire 31, a second signal wire 32, a signal isolation line 33 and a negative power signal line 35) arranged at a side, away from the base 10, of the touch electrode layer, and a second insulating layer 45 arranged at a side, away from the base 10, of the metal wiring layer.

When the touch substrate with the above-mentioned structure is manufactured, the specific manufacturing method is as follows:

at step 1, as shown in FIG. 1, a plurality of electrode connecting bridges 20 are formed on a base 10 by adopting an indium tin oxide (ITO) material through a sputtering process and a photolithography process. When the sputtering process is carried out, the sputtering temperature is normal temperature, the square resistance of the formed electrode connecting bridge 20 is less than or equal to 36 Ω/square, and the transmittance is greater than or equal to 80%.

Figure 2:
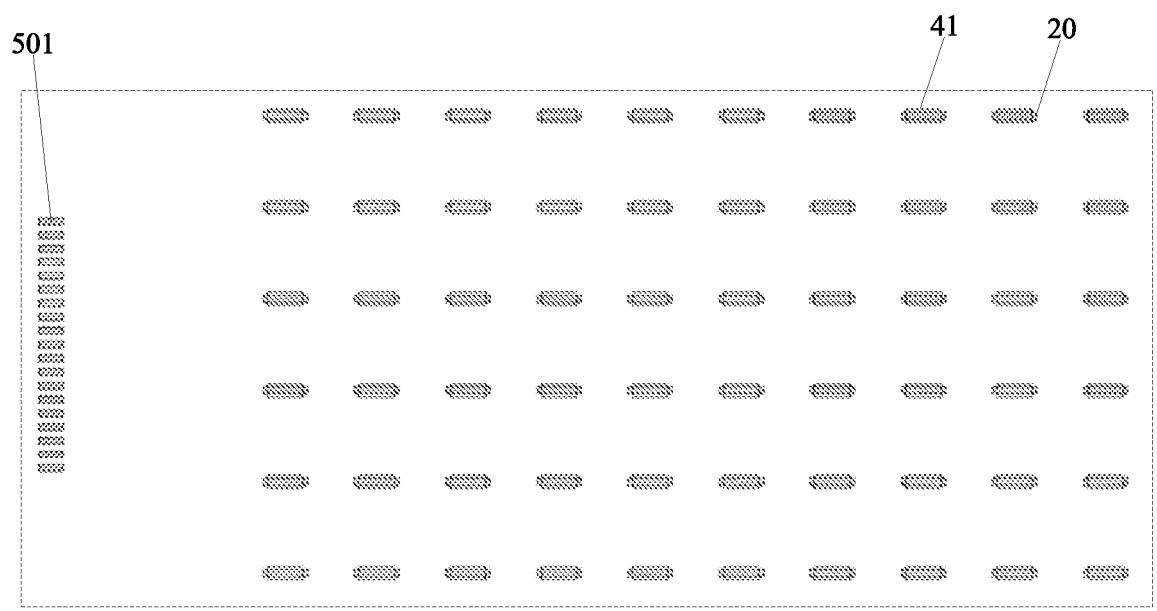
FIG. 2 is a schematic diagram of manufacturing a first insulating layer on the electrode connecting bridge provided by the present disclosure.

At step 2, as shown in FIG. 2, a first insulating film is manufactured at a side, away from the base 10, of the plurality of electrode connecting bridges 20 by adopting an organic insulating material, and a photoetching process is carried out on the first insulating film to form a first insulating layer. The curing temperature of the first insulating layer is less than 150° C.

Figure 3:
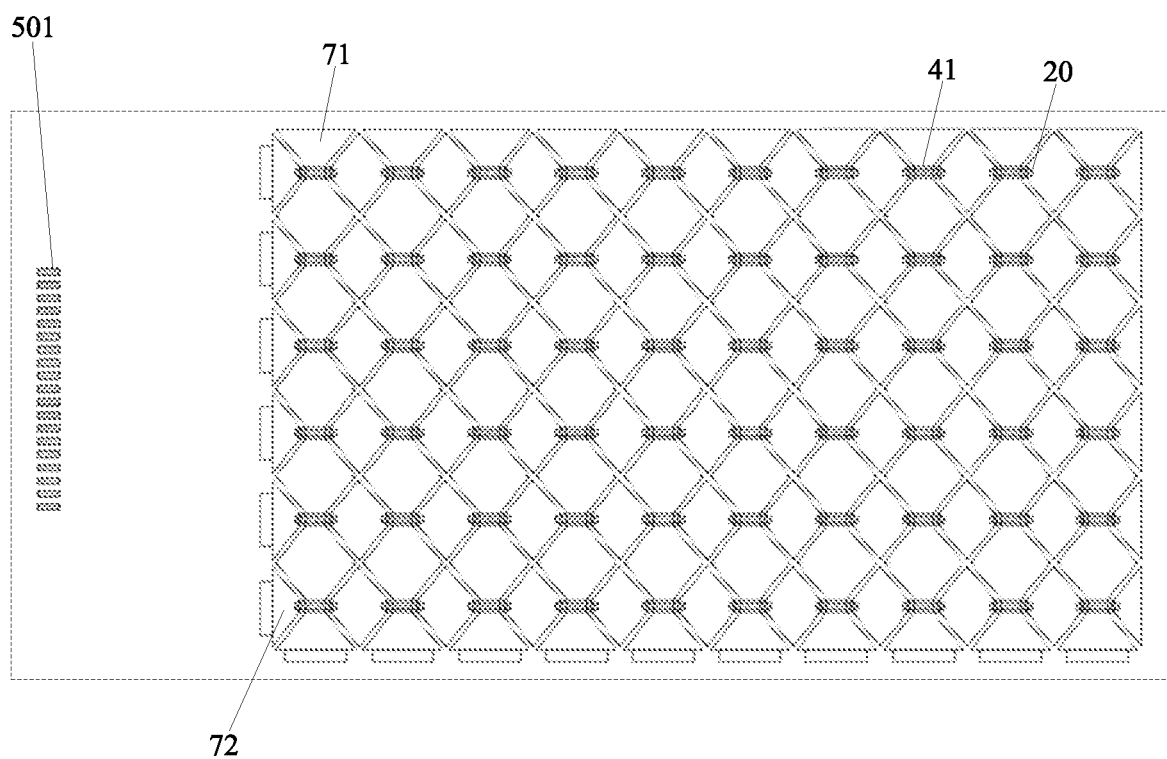
FIG. 3 is a schematic diagram of manufacturing a touch electrode layer on the first insulating layer provided by the present disclosure.

At step 3, as shown in FIG. 3, a touch electrode layer is manufactured at a side, away from the base 10, of the first insulating layer by adopting an ITO material through a sputtering process and a photoetching process. When the sputtering process is carried out, the sputtering temperature is normal temperature, the square resistance of the formed touch electrode layer is required to be less than or equal to 36 Ω/square, and the transmittance is greater than or equal to 80%.

Figure 4:
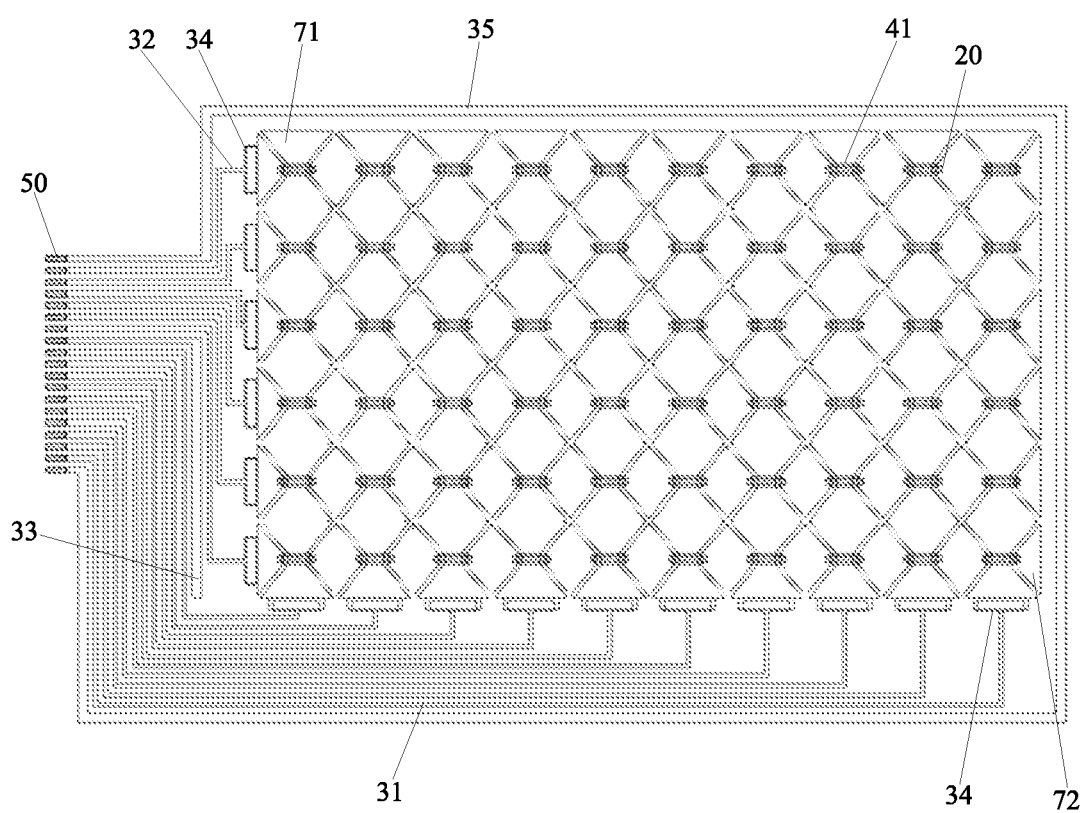
FIG. 4 is a schematic diagram of manufacturing a signal wiring layer on the touch electrode layer provided by the present disclosure.

At step 4, as shown in FIG. 4, a metal wiring layer is manufactured at a side, away from the base 10, of the touch electrode layer by adopting a metal material through a sputtering process and a photoetching process. When the sputtering process is carried out, the sputtering temperature is normal temperature, and the square resistance of the formed metal wiring layer is required to be less than or equal to 4 Ω/square.

Figure 5:
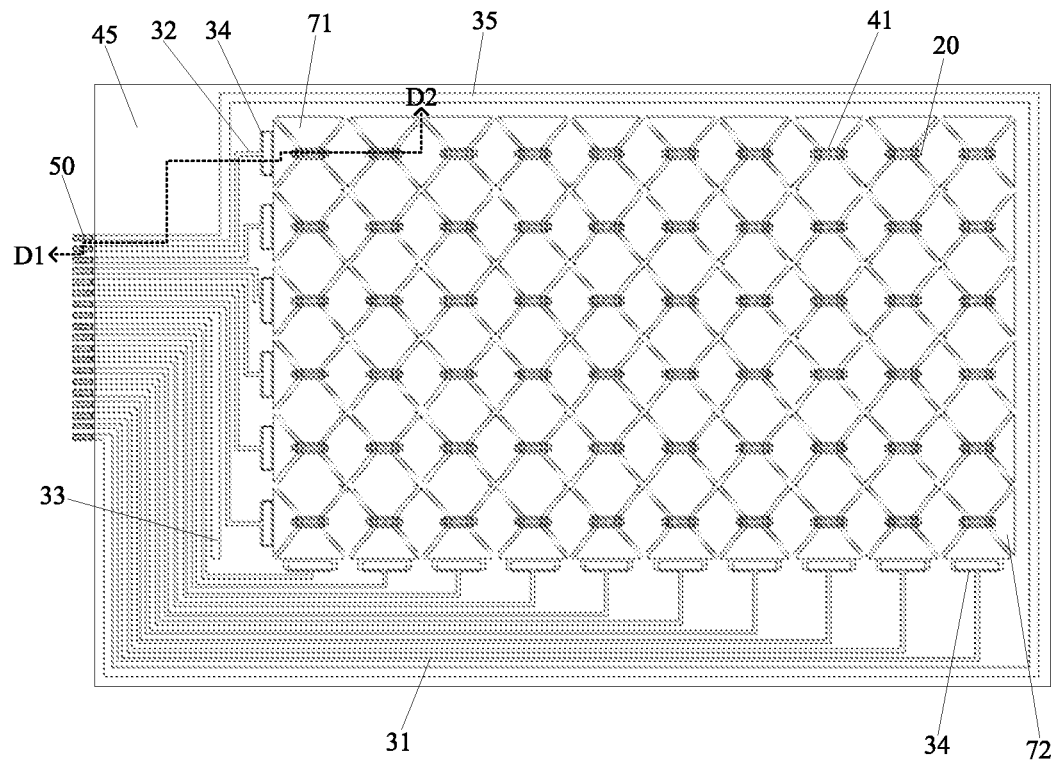
FIG. 5 is a schematic diagram of manufacturing a second insulating layer on the signal wiring layer provided by the present disclosure.
Figure 6:
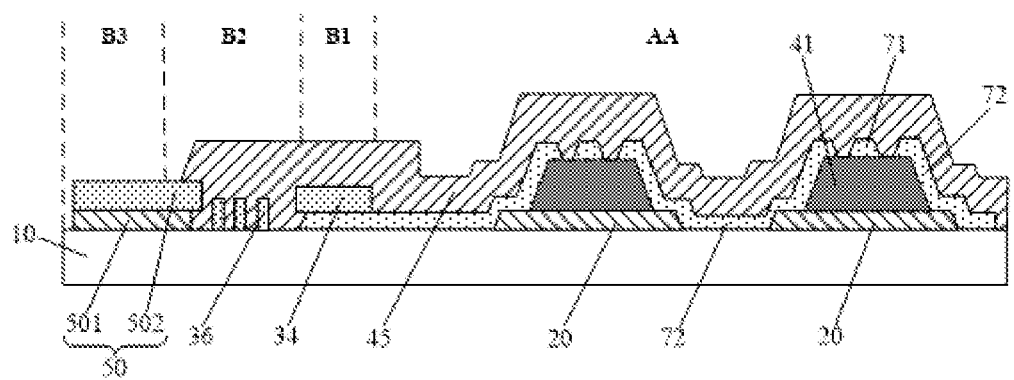
FIG. 6 is a cross-sectional view taken along a direction of D1-D2 in FIG. 5.

At step 5, as shown in FIG. 5, a second insulating film is manufactured at a side, away from the base 10, of the metal wiring layer by adopting an organic insulating material, and a photoetching process is carried out on the second insulating film to form a second insulating layer 45. The curing temperature for the second insulating layer 45 is less than 150° C.

Figure 7:
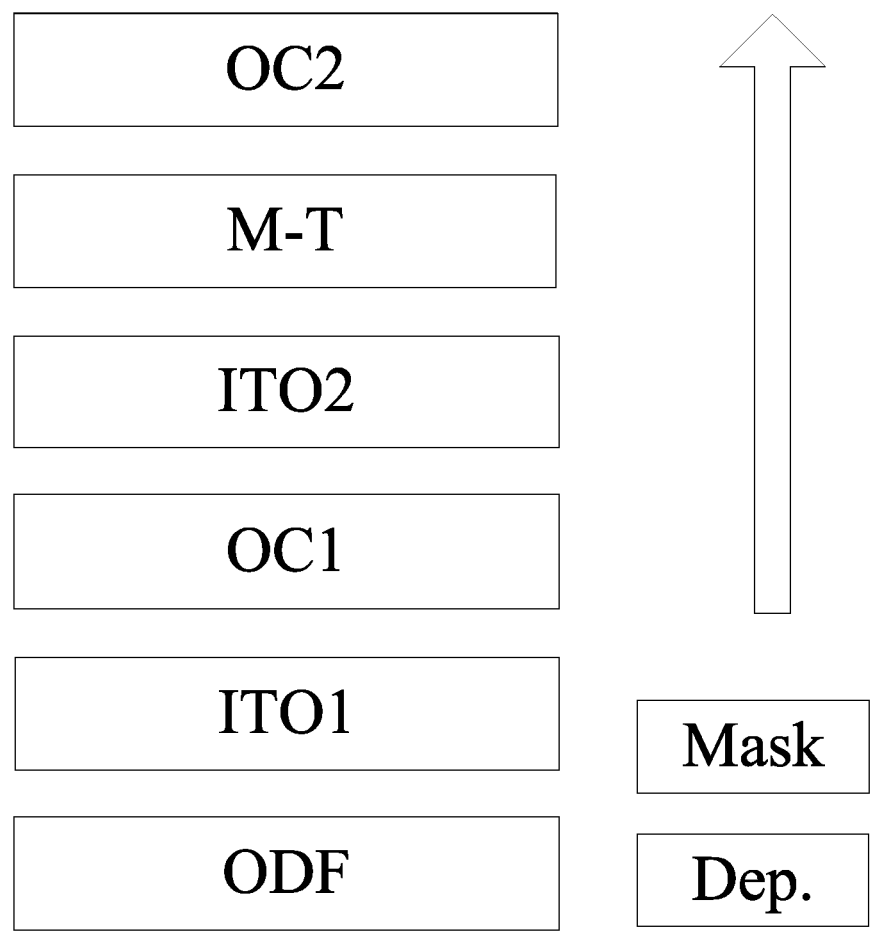
FIG. 7 is a schematic diagram of a first manufacturing process of a touch substrate provided by the present disclosure.

As shown in FIG. 7, when the touch substrate with the above-mentioned structure is manufactured, an electrode connecting bridge manufacturing process (i.e. ITO1 manufacturing process), a first insulating layer manufacturing process (i.e. OC1 manufacturing process), a touch electrode layer manufacturing process (i.e. ITO2 manufacturing process), a metal wiring layer manufacturing process (i.e. M-T manufacturing process) and a second insulating layer manufacturing process (i.e. OC2 manufacturing process) are sequentially performed. When the touch substrate is manufactured on a liquid crystal display panel (ODF panel), a color film substrate of the liquid crystal display panel can be reused as the base, and all the structures included in the touch substrate is directly manufactured on the color film substrate. It should be noted that Dep in FIG. 7 represents deposition, i.e. deposition is performed before mask starts.

Therefore, when the touch substrate with the above-mentioned structure is manufactured, five photoetching processes are needed, namely five Masks are adopted, so that the process flow is complicated, the capacity is occupied, the formed ITO material layer would be corroded by a metal etching solution when the metal wiring layer is manufactured, and the yield of the touch substrate is reduced.

Referring to FIGS. 8-12, embodiments of the present disclosure provide a touch substrate including: a base 10;

a plurality of electrode connecting bridges 20 arranged on the base 10, where the plurality of electrode connecting bridges 20 are arranged in an array form;

a signal wiring layer 30 arranged at a side, away from the base 10, of the electrode connecting bridge 20, where the signal wiring layer 30 includes a plurality of first signal wires 31 and a plurality of second signal wires 32;

an insulating layer arranged at a side, away from the base 10, of the signal wiring layer 30, where the insulating layer includes a first insulating patterns 41 being in one-to-one correspondence with the electrode connecting bridges 20 and a second insulating pattern 42 covering the signal wiring layer 30; and a touch electrode layer arranged at one side, away from the base 10, of the insulating layer, where the touch electrode layer includes a plurality of first touch electrodes 71 and a plurality of second touch electrodes 72, and the first touch electrodes 71 and the second touch electrodes 72 are arranged in a crossed manner; the first signal wires 31 are electrically connected with the first touch electrodes 71 in a one-to-one correspondence manner, and the second signal wires 32 are electrically connected with the second touch electrodes 72 in a one-to-one correspondence manner; an orthographic projection of the first touch control electrode 71 onto the base 10 and an orthographic projection of the electrode connecting bridge 20 onto the base 10 have a first overlapping area, and the first insulating patterns 41 cover the first overlapping areas in a one-to-one correspondence manner; each second touch electrode includes a plurality of electrode patterns which are arranged at intervals, and adjacent electrode patterns in the plurality of electrode patterns are electrically connected through the electrode connecting bridge 20.

When the touch substrate with the above-mentioned structure is manufactured, the manufacturing method specifically includes the following steps:

at step 1, as shown in FIG. 1, an ITO film layer is deposited on a base 10 by adopting an ITO material through a sputtering process, a photoresist is coated at a side, away from the base 10, of the ITO film layer, the photoresist is exposed and developed to form a photoresist retaining area and a photoresist removing area, and the photoresist retaining area corresponds to an area where the electrode connecting bridge 20 is located, and the photoresist removing area corresponds to other areas except the areas where the electrode connecting bridges 20 are located, the ITO film layer located in the photoresist removing area is removed by adopting an etching process, and the remaining photoresist is stripped to form a plurality of electrode connecting bridges 20 which are arranged in an array form. Illustratively, when the sputtering process is carried out, the sputtering temperature is normal temperature, the square resistance of the formed electrode connecting bridge 20 is less than or equal to 36 Ω/square, and the transmittance is greater than or equal to 80%.

Figure 8:
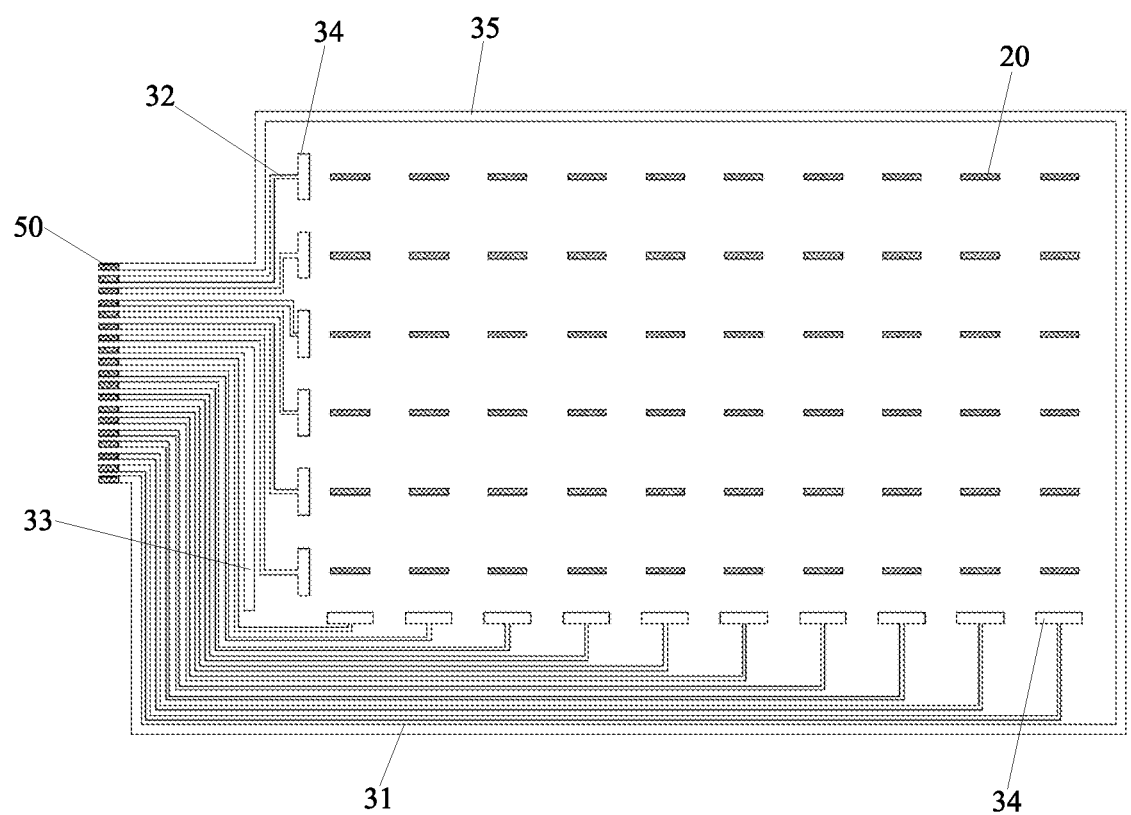
FIG. 8 is a schematic diagram of manufacturing a signal wiring layer on an electrode connecting bridge provided by an embodiment of the present disclosure.

At step 2, as shown in FIG. 8, a metal material layer is deposited at a side, away from the base 10, of the plurality of electrode connecting bridges 20 by adopting a metal material through a sputtering process, a photoresist is coated at a side, away from the base 10, of the metal material layer, the photoresist is exposed and developed to form a photoresist retaining area and a photoresist removing area, the photoresist retaining area corresponds to an area where the signal wiring layer 30 is located, the photoresist removing area corresponds to other areas except the area where the signal wiring layer 30 is located, the metal material layer located in the photoresist removing area is removed by adopting an etching process, and the remaining photoresist is stripped to form a signal wiring layer 30, where the signal wiring layer 30 includes a plurality of first signal wires 31 and a plurality of second signal wires 32. Illustratively, when the sputtering process is carried out, the sputtering temperature is normal temperature, and the square resistance of the formed metal wiring layer is required to be less than or equal to 4 Ω/square. It should be noted that the metal material is selected from a metal material having a good conductive property, and for example, the metal material may be selected from Cu, Al, or Al alloy, etc.

Figure 9:
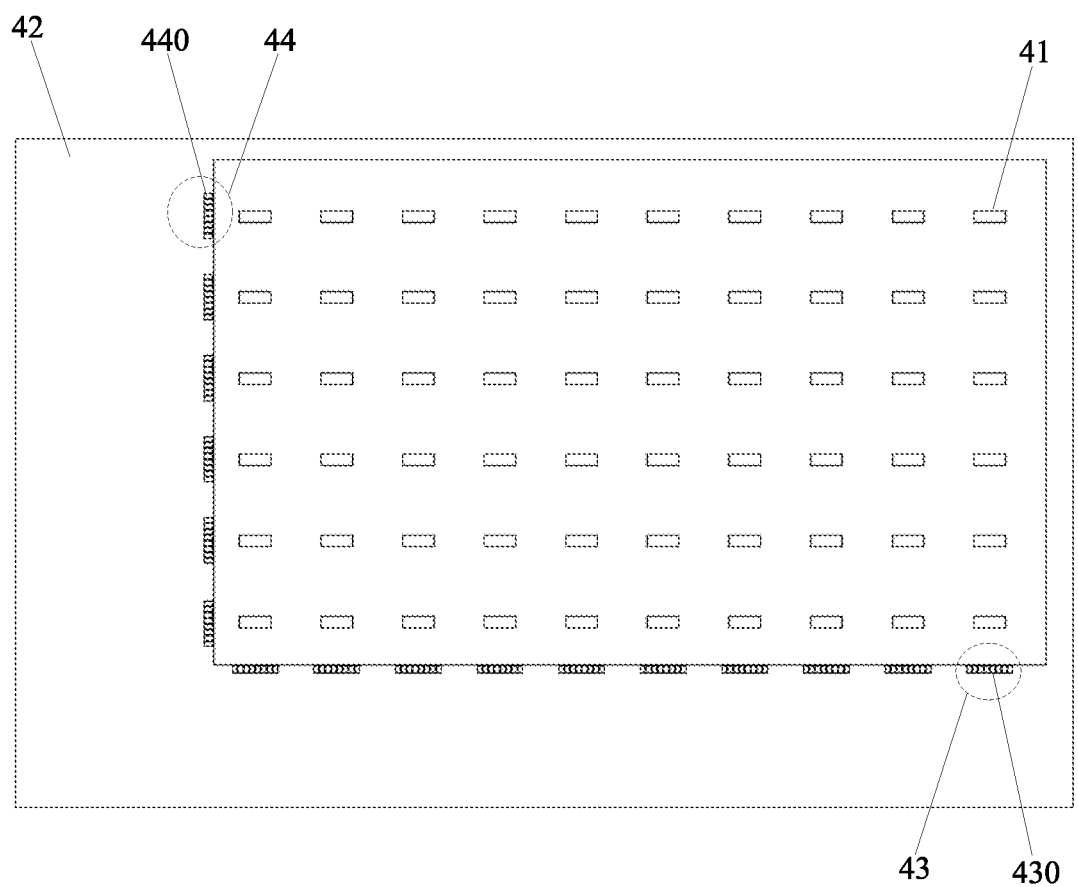
FIG. 9 is a schematic layout view of a first insulating pattern and a second insulating pattern provided by an embodiment of the present disclosure.
Figure 10:
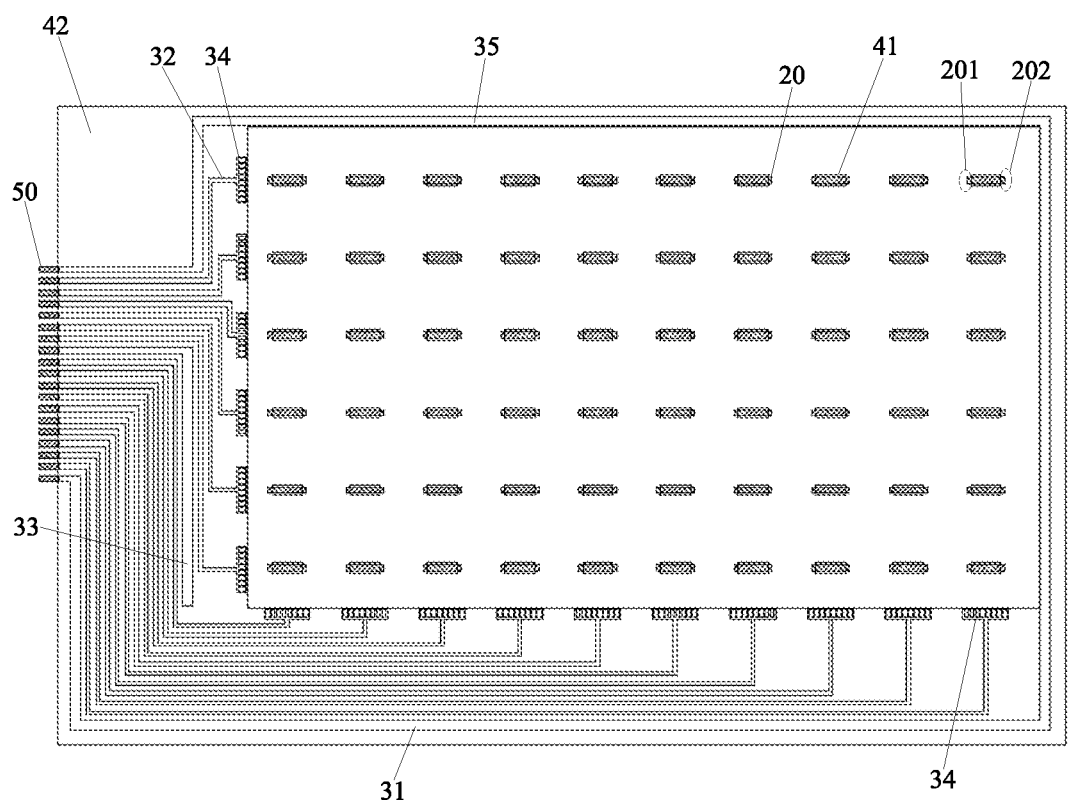
FIG. 10 is a schematic diagram of manufacturing an insulating layer on the signal wiring layer provided by an embodiment of the present disclosure.

At step 3, as shown in FIGS. 9 and 10, an insulating film is coated at a side, away from the base 10, of the signal wiring layer 30 by adopting an organic insulating material, the insulating film is exposed and developed to form an insulating layer, where the insulating layer includes first insulating patterns 41 being in one-to-one correspondence with the electrode connecting bridges 20 and a second insulating pattern 42 covering the signal wiring layer 30. Illustratively, the curing temperature for the insulating layer is less than 150° C.

Figure 11:
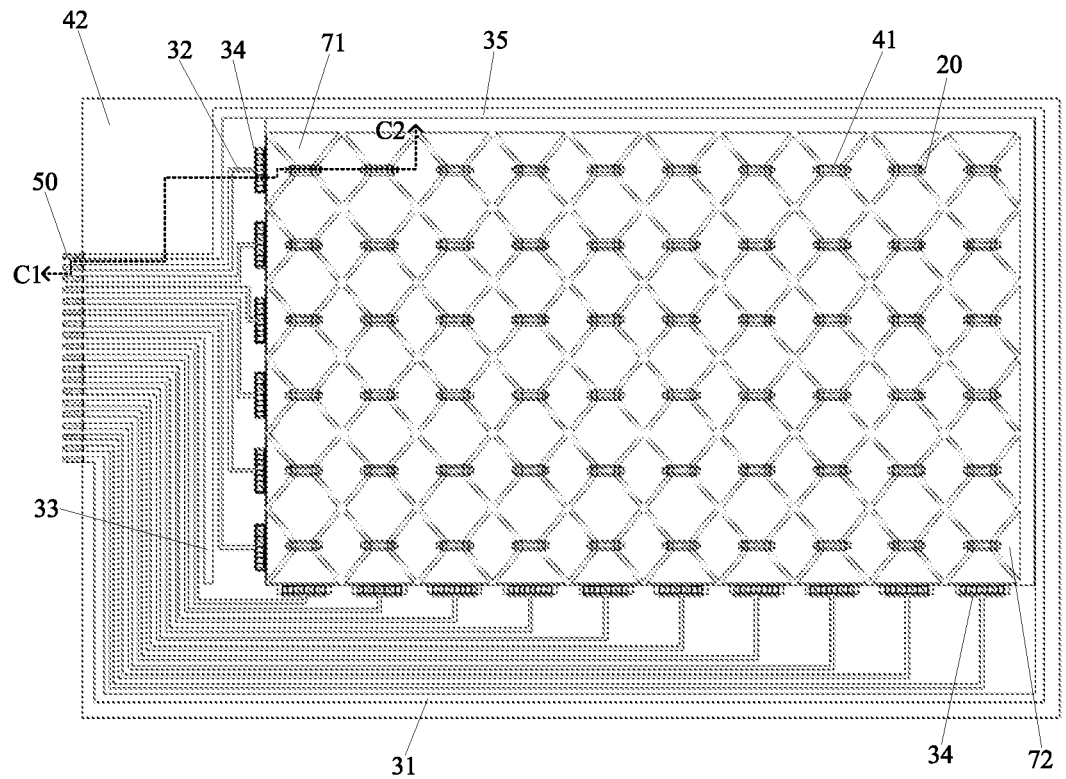
FIG. 11 is a schematic diagram of manufacturing a touch electrode layer on the insulating layer provided by an embodiment of the present disclosure.

At step 4, as shown in FIG. 11, an ITO film layer is deposited at a side, away from the base 10, of the insulating layer by adopting an ITO material through a sputtering process, a photoresist is coated at a side, away from the base 10, of the ITO film layer, and the photoresist is exposed and developed to form a photoresist retaining area and a photoresist removing area, the photoresist retaining area corresponds to an area where the touch electrode layer is located, the photoresist removing area corresponds to other areas except the area where the touch electrode layer is located, the ITO film layer located in the photoresist removing area is removed by adopting an etching process, and the remaining photoresist is stripped to form a touch electrode layer. Illustratively, when the sputtering process is carried out, the sputtering temperature is normal temperature, the square resistance of the formed electrode connecting bridge 20 is less than or equal to 36 Ω/square, and the transmittance is greater than or equal to 80%.

It should be noted that when the touch substrate and the liquid crystal display panel form a touch display device of an On-Cell structure, the color film substrate in the liquid crystal display panel is reused as the base 10 of the touch substrate, and the electrode connecting bridges 20, the signal wiring layer 30, the insulating layer and the touch electrode layer in the touch substrate are all formed on the color film substrate. In the whole manufacturing process of the touch substrate, the manufacturing temperature needs to be less than the damage temperature to the liquid crystal display panel, namely the damage temperature to the liquid crystal in the liquid crystal display panel.

The plurality of electrode connecting bridges 20 are arranged in an array form, the plurality of electrode connecting bridges 20 can be divided into a plurality of rows of electrode connecting bridges 20 arranged along a first direction, and each row of electrode connecting bridges 20 includes a plurality of electrode connecting bridges 20 arranged at intervals along a second direction in sequence; the plurality of electrode connecting bridges 20 can be divided into a plurality of columns of electrode connecting bridges 20 arranged along the second direction, and each column of electrode connecting bridges 20 includes a plurality of electrode connecting bridges 20 arranged at intervals along the first direction in sequence.

The touch electrode layer includes a plurality of first touch electrodes 71 and a plurality of second touch electrodes 72. Illustratively, the first touch electrodes 71 extend along the first direction and the second touch electrodes 72 extend along the second direction. Illustratively, the first direction includes a Y direction and the second direction includes an X direction. One of the first touch electrode 71 and the second touch electrode 72 is a driving electrode, and the other of the first touch electrode 71 and the second touch electrode 72 is a sensing electrode.

The plurality of first touch electrodes 71 are in one-to-one correspondence with the plurality of columns of electrode connecting bridges 20, the orthographic projections of all the first touch electrode 71 onto the base 10 and the orthographic projections of all the electrode connecting bridges 20 in the corresponding column of electrode connecting bridges 20 onto the base 10 respectively form the first overlapping areas, and the first insulating patterns 41 cover the first overlapping areas in a one-to-one correspondence manner. The first insulating pattern 41 can insulate the first touch electrode 71 from the electrode connecting bridge 20. The second insulating pattern 42 can cover the signal wiring layer 30.

The plurality of second touch electrodes 72 are in one-to-one correspondence with the plurality of rows of electrode connecting bridges 20, each second touch electrode 72 includes a plurality of electrode patterns arranged at intervals, the plurality of electrode patterns are arranged along the second direction, and the plurality of electrode patterns are alternately arranged with the plurality of electrode connecting bridges 20 in the corresponding row of electrode connecting bridges 20, adjacent electrode patterns in the plurality of electrode patterns are electrically connected through the corresponding electrode connecting bridge 20, and the corresponding electrode connecting bridge 20 is located between the adjacent electrode patterns. It should be noted that, as shown in FIGS. 10 and 12, each electrode connecting bridge 20 includes a first end portion 201 and a second end portion 202, orthographic projections of the first end portion 201 and the second end portion 202 onto the base 10 both do not overlap with an orthographic projection of the first insulating pattern 41 onto the base 10, and the first end portion 201 and the second end portion 202 are used to electrically connect the adjacent electrode patterns.

The first signal wires 31 are electrically connected with the first touch electrodes 71 in a one-to-one correspondence manner, and the second signal wires 32 are electrically connected with the second touch electrodes 72 in a one-to-one correspondence manner. Illustratively, the first touch electrode 71 is a sensing electrode, the second touch electrode 72 is a driving electrode, the first signal wire 71 can transmit a sensing signal sensed by the first touch electrode 71 to a chip structure, and the second signal wire 72 can provide a driving signal for the second touch electrode 72.

Figure 12:
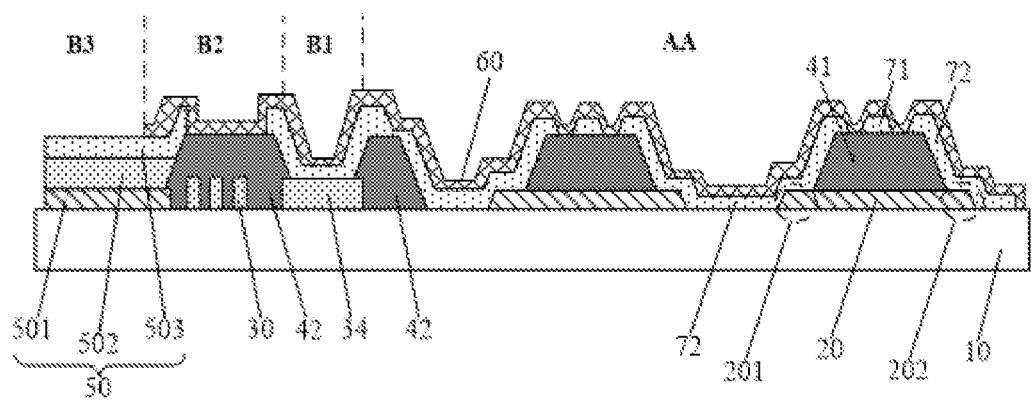
FIG. 12 is a cross-sectional view taken along a direction of C1-C2 in FIG. 11.

It should be noted that in FIG. 12, AA represents a touch area, B1 represents a lap joint area of the touch electrode with the lap joint end 34, B2 represents a wiring area, and B3 represents a binding area.

Figure 13:
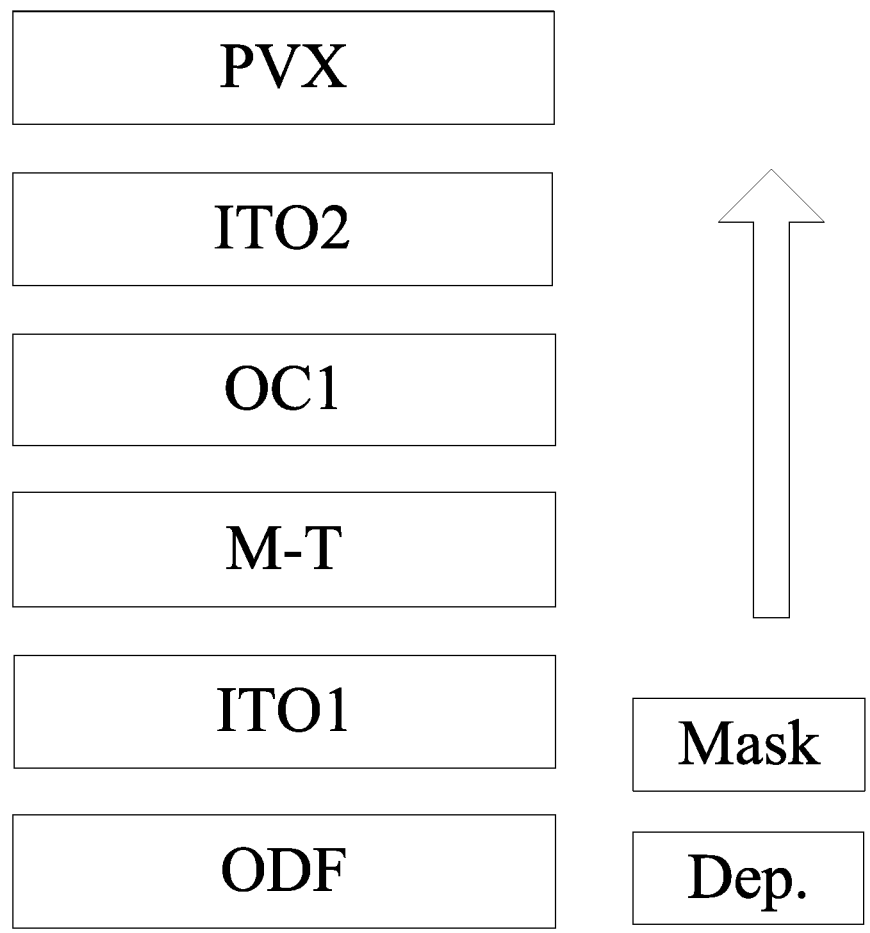
FIG. 13 is a schematic diagram of a second manufacturing process of the touch substrate provided by an embodiment of the present disclosure.

According to the above-mentioned specific structure and method of forming the touch substrate, as shown in FIG. 13, when the touch substrate provided by the embodiments of the present disclosure is manufactured, an electrode connecting bridge manufacturing process (i.e. ITO1 manufacturing process), a signal wiring layer manufacturing process (i.e. M-T manufacturing process), an insulating layer manufacturing process (i.e. OC1 manufacturing process) and a touch electrode layer manufacturing process (i.e. ITO2 manufacturing process) are sequentially performed. Due to the fact that the insulating layer can cover the signal wiring layer 30 and the touch electrode layer has better stability, after the touch electrode layer is manufactured, a layer of insulating layer does not need to be manufactured by adopting a photoetching process, when the touch substrate provided by the present disclosure is manufactured, only four photoetching processes are needed, the manufacturing process flow is effectively simplified, the capacity is improved, and the competitiveness of the product is enhanced. In addition, since the touch electrode layer is formed after the signal wiring layer 30 is formed, the etching solution applied when the signal wiring layer 30 is manufactured is prevented from corroding the touch electrode layer, so that the performance and the yield of the touch substrate are effectively improved.

In addition, when the electrode connecting bridges 20 are made of ITO, the bridge points can be completely invisible, and therefore the touch substrate provided by the above-mentioned embodiments has a visual advantage compared with a touch substrate including metal connecting bridges.

As shown in FIG. 12, in some embodiments, the touch substrate further includes:

a plurality of binding pins, where a first part of binding pins 50 in the plurality of binding pins 50 are electrically connected with the first signal wires 31 in a one-to-one correspondence manner, and a second part of binding pins 50 in the binding pins 50 are electrically connected with the second signal wires 32 in a one-to-one correspondence manner;

the binding pin 50 includes a first binding pattern 501, a second binding pattern 502 and a third binding pattern 503 which are sequentially stacked along a direction away from the base 10, where the first binding pattern 501 and the electrode connecting bridges 20 are arranged on the same layer and are made of the same material, the second binding pattern 502 and the corresponding electrically connected first signal wire 31 or second signal wire 32 form an integrated structure, and the third binding pattern 503 and the touch electrode layer are arranged on the same layer and are made of the same material.

Specifically, the touch substrate further includes the plurality of binding pins 50, illustratively, the plurality of binding pins 50 are used for binding with a flexible circuit board or a chip structure, and the plurality of binding pins 50 can receive driving signals provided by the flexible circuit board or the chip structure, or can transmit sensed sensing signals to the flexible circuit board or the chip structure.

The specific structure of the binding pin 50 is various, illustratively, the binding pin 50 includes the first binding pattern 501, the second binding pattern 502 and the third binding pattern 503 which are sequentially stacked along the direction away from the base 10.

Illustratively, the manufacturing the plurality of binding pins 50 specifically includes the following steps:

the first binding pattern 501 and the electrode connecting bridges 20 are simultaneously formed through one patterning process;

the second binding pattern 502 and the signal wiring layer 30 of an integrated structure are simultaneously formed through one patterning process; and the third binding pattern 503 and the touch electrode layer are simultaneously formed through one patterning process.

According to the touch substrate provided by the above-mentioned embodiments, the binding pin 50 includes the first binding pattern 501, the second binding pattern 502 and the third binding pattern 503, so that the binding pin 50 is formed into a structure similar to a sandwich, and the structure not only ensures that the binding pin 50 has good conductive performance, but also ensures that the binding pin 50 can be firmly attached to a surface of the base 10.

In addition, since the third binding pattern 503 in the binding pin 50 of the above-mentioned structure and the touch electrode layer are made of the same material, and the touch electrode layer generally adopts ITO with good stability, the third binding pattern 503 has good stability, so that a surface, away from the base 10, of the binding pin 50 has good stability, and good conductive performance of the binding pin 50 is ensured.

In addition, the binding pin 50 of the above-mentioned structure can be formed in the same patterning process as other structures in the touch substrate, so that an additional manufacturing process is avoided, the manufacturing process of the touch substrate is effectively simplified, and the manufacturing cost is saved.

As shown in FIGS. 9, 11 and 12, in some embodiments, the orthographic projection of the first touch electrode 71 onto the base 10 and an orthographic projection of a lap joint end 34 of the corresponding first signal wire 31 onto the base 10 have a second overlapping area, first through hole structures 43 being in one-to-one correspondence with the second overlapping areas are arranged on the second insulating pattern 42, the first through hole structure 43 includes a plurality of first through holes 430, and the first touch electrode 71 is electrically connected with the lap joint end 34 of the corresponding first signal wire 31 through the plurality of first through holes 430 in the corresponding first through hole structure 43; and/or, an orthographic projection of the second touch electrode 72 onto the base 10 and an orthographic projection of a lap joint end 34 of the corresponding second signal wire 32 onto the base 10 have a third overlapping area, second through hole structures 44 being in one-to-one correspondence with the third overlapping areas are arranged on the second insulating pattern 42, the second through hole structure 44 includes a plurality of second through holes 440, and the second touch electrode 72 is electrically connected with the lap joint end 34 of the corresponding second signal wire 32 through the plurality of second through holes 440 in the corresponding second through hole structure 44.

Specifically, the orthographic projection of each first touch electrode 71 onto the base 10 can have the second overlapping area with the orthographic projection of the lap joint end 34 of the corresponding first signal wire 31 onto the base 10. The second insulating pattern 42 is provided with the first through hole structures 43 being in one-to-one correspondence with the second overlapping areas. Illustratively, the first through hole structure 43 includes the plurality of first through holes, and at least a portion of each first through hole is located in the second overlapping area. The first touch electrode 71 covers the plurality of first through holes in the corresponding first through hole structure 43, and the first touch electrode 71 can be electrically connected with the lap joint end 34 of the corresponding first signal wire 31 through the plurality of first through holes in the corresponding first through hole structure 43.

The orthographic projection of each second touch electrode 72 onto the base 10 can have the third overlapping area with the orthographic projection of the lap joint end 34 of the corresponding second signal wire 32 onto the base 10. The second insulting pattern 42 is provided with the second through hole structures 44 being in one-to-one correspondence with the third overlapping areas. Illustratively, the second through structure 44 includes the plurality of second through holes, and at least a portion of each second through hole is located in the third overlapping area. The second touch electrode 72 covers the plurality of second through holes in the corresponding second through hole structure 44, and the second touch electrode 72 can be electrically connected with the lap joint end 34 of the corresponding second signal wire 32 through the plurality of second through holes in the corresponding second through hole structure 44.

Illustratively, the sizes of the first through holes and the second through holes are greater than an exposure resolution of an organic material adopted by the insulating layer. Illustratively, the first through hole and the second through hole are 100 μm×100 μm in size.

According to the touch substrate provided by the above-mentioned embodiments, the first touch electrode 71 is arranged to be electrically connected with the lap joint end 34 of the corresponding first signal wire 31 through the plurality of first through holes, and the second touch electrode 72 is arranged to be electrically connected with the lap joint end 34 of the corresponding second signal wire 32 through the plurality of second through holes, good connection performance between the touch electrode and the lap joint end 34 of the signal wire can be guaranteed, and in the manufacturing process of the touch substrate, the lap joint end 34 of the signal wire is prevented from being exposed in a large area, so that the lap joint end 34 of the signal wire is better prevented from being oxidized, and the conductivity of the lap joint end 34 of the signal wire is guaranteed.

In some embodiments, orthographic projections of the plurality of first through holes onto the base 10 are located inside the orthographic projection of the lap joint end 34 of the first signal wire 31 onto the base 10; and/or the orthographic projections of the plurality of second through holes onto the base 10 are located inside the orthographic projection of the lap joint end 34 of the second signal wires 32 onto the base 10.

Specifically, the first signal wire 31 and the second signal wire 32 may be of a stacked metal pattern structure. Illustratively, when the first signal wire 31 and the second signal wire 32 both include molybdenum/aluminum/molybdenum which are sequentially stacked along the direction away from the base 10, because the aluminum is easily corroded by a developing solution used for manufacturing the insulating layer, the above-mentioned arrangement manner prevents the developing solution from corroding the metal aluminum from a side face of the lap joint end of the signal wire, so that the yield of the touch substrate is well ensured.

As shown in FIG. 12, in some embodiments, the touch substrate further includes: a passivation layer 60 located at a side, away from the base 10, of the touch electrode layer, where the passivation layer 60 exposes the plurality of binding pins 50 of the touch substrate.

According to the touch substrate provided by the above-mentioned embodiments, the passivation layer 60 is arranged on the side, away from the base 10, of the touch electrode layer, so that other structures except the plurality of binding pins 50 on the touch substrate can be protected, and the yield and the touch performance of the touch substrate are better improved.

As shown in FIG. 11, in some embodiments, the signal wiring layer 30 further includes: a signal isolation line 33, where the plurality of first signal wires 31 are located on a first side of the signal isolation line 33, and the plurality of second signal wires 32 are located on a second side of the signal isolation line 33.

Specifically, the signal wiring layer 30 further includes the signal isolation line 33, and the signal isolation line 33 is used for isolating the first signal wires 31 from the second signal wires 32 and avoiding mutual interference between signals transmitted on the first signal wires 31 and signals transmitted on the second signal wires 32.

It should be noted that a stable signal having a fixed potential is applied to the signal isolation line 33. Illustratively, the signal isolation line 33 is electrically connected to the corresponding binding pin 50 to receive a stable electrical signal provided by the binding pin 50. Illustratively, a GND signal is applied on the signal isolation line 33.

Illustratively, the first side includes a left side and a lower side of the signal isolation line 33, and the second side includes a right side and an upper side of the signal isolation line 33.

In some embodiments, the touch substrate further includes a negative power signal line 35, where the negative power signal line 35 surrounds a touch area of the touch substrate.

An embodiment of the present disclosure further provides a touch display device which includes the touch substrate provided by the above-mentioned embodiments.

According to the above-mentioned touch substrate, the electrode connecting bridges 20, the signal wiring layer 30, the insulating layer and the touch electrode layer are sequentially manufactured on the base 10, the insulating layer can cover the signal wiring layer 30, and the touch electrode layer has good stability, so that after the touch electrode layer is manufactured, a layer of insulating layer is not required to be manufactured by adopting a photoetching process, and therefore when the touch substrate provided by the present disclosure is manufactured, only four photoetching processes are needed, the manufacturing process flow is effectively simplified, the capacity is improved, and the competitiveness of the product is enhanced. In addition, since the touch electrode layer is formed after the signal wiring layer 30 is formed, the etching solution applied when the signal wiring layer 30 is manufactured is prevented from corroding the touch electrode layer, so that the performance and the yield of the touch substrate are effectively improved. In addition, when the electrode connecting bridges 20 are made of ITO, the bridge points can be completely invisible, and therefore the touch substrate provided by the above-mentioned embodiments has a visual advantage compared with a touch substrate including metal connecting bridges.

Therefore, when the touch display device provided by the embodiment of the present disclosure includes the above-mentioned touch substrate, the touch display device also has the above-mentioned beneficial effects, and the detailed description is omitted.

It should be noted that the touch display device may be: any product or component with display function, such as a television, a display, a digital photo frame, a mobile phone, and a tablet computer.

In some embodiments, the touch display device further includes a display panel, where the display panel includes an array substrate and a color film substrate which are arranged oppositely, and a liquid crystal layer arranged between the array substrate and the color film substrate; and the color film substrate is reused as the base 10 in the touch substrate.

When the color film substrate is reused as the base 10 in the touch substrate, the electrode connecting bridges 20, the signal wiring layer 30, the insulating layer and the touch electrode layer included in the touch substrate are all formed on the color film substrate. Before all the structures included in the touch substrate are manufactured, a surface of the color film substrate in the display panel may be cleaned firstly, and specifically, the surface of the color film substrate may be cleaned by adopting a conventional cleaning manner such as rolling brush, disc brush, lotion spraying, and pure water spraying to remove dirt on the surface of the color film substrate.

According to the touch display device provided by the above-mentioned embodiments, the whole touch substrate is located between the color film substrate of the display panel and a polarizer in the touch display device, so that the touch display device is formed into an On-Cell structure. The touch display device of the On-Cell structure can not only reduce a thickness of the touch display device, but also reduce the manufacturing process of a backend module.

In some embodiments, the touch display device further includes a display panel, where the display panel and the touch substrate are stacked, and the touch electrode layer in the touch substrate is located between the display panel and the base 10 of the touch substrate.

The touch display device of the above-mentioned structure is formed into an Out-Cell structure, and the touch substrate can be pasted on the display panel by adopting a glue material.

An embodiment of the present disclosure further provides a method of forming a touch substrate, which is used for manufacturing the touch substrate provided by the above-mentioned embodiments, and the manufacturing method includes the following steps:

a plurality of electrode connecting bridges 20 are manufactured on a base 10, where the plurality of electrode connecting bridges 20 are arranged in an array form;

a signal wiring layer 30 is manufactured at a side, away from the base 10, of the electrode connecting bridge 20, where the signal wiring layer 30 includes a plurality of first signal wires 31 and a plurality of second signal wires 32;

an insulating layer is manufactured at a side, away from the base 10, of the signal wiring layer 30, where the insulating layer includes a first insulating patterns 41 being in one-to-one correspondence with the electrode connecting bridges 20 and a second insulating pattern 42 covering the signal wiring layer 30; and a touch electrode layer is manufactured at a side, away from the base 10, of the insulating layer, where the touch electrode layer includes a plurality of first touch electrodes 71 and a plurality of second touch electrodes 72, and the first touch electrodes 71 and the second touch electrodes 72 are arranged in a crossed manner; the first signal wires 31 are electrically connected with the first touch electrodes 71 in a one-to-one correspondence manner, and the second signal wires 32 are electrically connected with the second touch electrodes 72 in a one-to-one correspondence manner; an orthographic projection of the first touch control electrode 71 onto the base 10 and an orthographic projection of the electrode connecting bridge 20 onto the base 10 have a first overlapping area, and the first insulating patterns 41 cover the first overlapping areas in a one-to-one correspondence manner; each second touch electrode 72 includes a plurality of electrode patterns which are arranged at intervals, and adjacent electrode patterns in the plurality of electrode patterns are electrically connected through the electrode connecting bridge 20.

When the touch substrate is manufactured by the manufacturing method provided by the embodiment of the present disclosure, an electrode connecting bridge manufacturing process (i.e. ITO1 manufacturing process), a signal wiring layer manufacturing process (i.e. M-T manufacturing process), an insulating layer manufacturing process (i.e. OC1 manufacturing process) and a touch electrode layer manufacturing process (i.e. ITO2 manufacturing process) are sequentially performed. Due to the fact that the insulating layer can cover the signal wiring layer 30 and the touch electrode layer has good stability, after the touch electrode layer is manufactured, a layer of insulating layer does not need to be manufactured by adopting a photoetching process, when the touch substrate is manufactured by adopting the manufacturing method provided by the embodiment of the present disclosure, only four photoetching processes are required, the manufacturing process flow is effectively simplified, and the capacity is improved, and the competitiveness of the product is enhanced. In addition, since the touch electrode layer is formed after the signal wiring layer 30 is formed, the etching solution applied when the signal wiring layer 30 is manufactured is prevented from corroding the touch electrode layer, so that the performance and the yield of the touch substrate are effectively improved.

In addition, when the electrode connecting bridges 20 are made of ITO, the bridge points can be completely invisible, and therefore the touch substrate manufactured by the manufacturing method provided by the embodiment of the present disclosure has a visual advantage compared with a touch substrate including metal connecting bridges.

In some embodiments, the manufacturing method further includes: a plurality of binding pins 50 are manufactured, where a first part of binding pins 50 in the plurality of binding pins 50 are electrically connected with the first signal wires 31 in a one-to-one correspondence manner, and a second part of binding pins 50 in the binding pins 50 are electrically connected with the second signal wires 32 in a one-to-one correspondence manner; and the binding pin 50 includes a first binding pattern 501, a second binding pattern 502 and a third binding pattern 503 which are sequentially stacked along a direction away from the base 10;

The manufacturing the plurality of binding pins 50 specifically includes the following steps:

the first binding pattern 501 and the electrode connecting bridges 20 are simultaneously formed through one patterning process;

the second binding pattern 502 and the signal wiring layer 30 of an integrated structure are simultaneously formed through one patterning process; and the third binding pattern 503 and the touch electrode layer are simultaneously formed through one patterning process.

According to the touch substrate manufactured by adopting the manufacturing method provided by the above-mentioned embodiments, the binding pin 50 is formed into a structure similar to a sandwich, and the structure not only ensures that the binding pin 50 has good conductive performance, but also ensures that the binding pin 50 can be firmly attached to a surface of the base 10.

In addition, since the third binding pattern 503 in the binding pin 50 of the above-mentioned structure and the touch electrode layer are made of the same material, and the touch electrode layer generally adopts ITO with good stability, the third binding pattern 503 has good stability, so that a surface, away from the base 10, of the binding pin 50 has good stability, and good conductive performance of the binding pin 50 is ensured.

In addition, according to the touch substrate manufactured by adopting the manufacturing method provided by the above-mentioned embodiments, the binding pins 50 and other structures in the touch substrate can be formed in the same patterning process, so that an additional manufacturing process is avoided, the manufacturing process of the touch substrate is effectively simplified, and the manufacturing cost is saved.

In some embodiments, the manufacturing the insulating layer on the side, away from the base 10, of the signal wiring layer 30 specifically includes the following steps:

an insulating film is formed on the side, away from the base 10, of the signal wiring layer 30;

the insulating film is patterned to form the first insulating pattern 41 and the second insulating pattern 42; the orthographic projection of the first touch control electrode 71 onto the base 10 and an orthographic projection of a lap joint end 34 of the corresponding first signal wire 31 onto the base 10 have a second overlapping area, first through hole structures 43 being in one-to-one correspondence with the second overlapping areas are arranged on the second insulating pattern 42, the first through hole structure 43 includes a plurality of first through holes, and the first touch electrode 71 is electrically connected with the lap joint end 34 of the corresponding first signal wire 31 through the plurality of first through holes in the corresponding first through hole structure 43; an orthographic projection of the second touch electrode 72 onto the base 10 and an orthographic projection of a lap joint end 34 of the second signal wire 32 onto the base 10 have a third overlapping area, second through hole structures 44 being in one-to-one correspondence with the third overlapping areas are arranged on the second insulating pattern 42, the second through structure 44 includes a plurality of second through holes, and the second touch electrode 72 is electrically connected with the lap joint end 34 of the corresponding second signal wire 32 through the plurality of second through holes in the corresponding second through hole structure 44.

Specifically, the insulating film is coated on the side, away from the base 10, of the signal wiring layer 30 by adopting an organic insulating material, and the insulating film is exposed and developed to form the insulating layer, where the insulating layer includes the first insulating patterns 41 being in one-to-one correspondence with the electrode connecting bridges 20 and the second insulating pattern 42 covering the signal wiring layer 30. Illustratively, the curing temperature for the insulating layer is less than 150° C.

According to the touch substrate manufactured by the manufacturing method provided by the above-mentioned embodiments, the first touch electrode 71 is electrically connected with the lap joint end 34 of the corresponding first signal wire 31 through the plurality of first through holes, and the second touch electrode 72 is electrically connected with the lap joint end 34 of the corresponding second signal wires 32 through the plurality of second through holes, good connection performance between the touch electrode and the lap joint end 34 of the signal wire can be guaranteed, and in the manufacturing process of the touch substrate, the lap joint end 34 of the signal wire is prevented from being exposed in a large area, so that the lap joint end 34 of the signal wire is better prevented from being oxidized, and the conductivity of the lap joint end 34 of the signal wire is guaranteed.

In some embodiments, orthographic projections of the plurality of first through holes onto the base 10 are located inside the orthographic projection of the lap joint end 34 of the first signal wire 31 onto the base 10; and/or the orthographic projections of the plurality of second through holes onto the base 10 are located inside the orthographic projection of the lap joint end 34 of the second signal wires 32 onto the base 10.

In some embodiments, the manufacturing method further includes: a passivation layer 60 is manufactured at a side, away from the base 10, of the touch electrode layer, where the passivation layer 60 exposes the plurality of binding pins 50 of the touch substrate.

Specifically, the passivation layer PVX may be made of a silicon oxynitride material, but is not limited thereto. It should be noted that the passivation layer is manufactured without a mask process.

According to the touch substrate manufactured by the manufacturing method provided by the above-mentioned embodiments, the passivation layer 60 is manufactured on the side, away from the base 10, of the touch electrode layer, so that other structures except the plurality of binding pins 50 on the touch substrate can be protected, and the yield and the touch performance of the touch substrate are better improved.

In some embodiments, the manufacturing method further includes:

a signal isolation line 33, the plurality of first signal wires 31 and the plurality of second signal wires 32 are simultaneously formed through one patterning process, where the plurality of first signal wires 31 are located on a first side of the signal isolation line 33, and the plurality of second signal wires 32 are located on a second side of the signal isolation line 33.

According to the touch substrate manufactured by the manufacturing method provided by the above-mentioned embodiments, the signal wiring layer 30 further includes the signal isolation line 33, and the signal isolation line 33 is used for isolating the first signal wires 3 1 from the second signal wires 32 and avoiding mutual interference between signals transmitted on the first signal wires 31 and signals transmitted on the second signal wires 32.

It should be noted that all the embodiments of the present disclosure are described in an incremental manner, that like parts of all the embodiments are referred to each other, and that each embodiment is described with emphasis upon differences from the other embodiments. In particular, with respect to the method embodiment, since it is substantially similar to the product embodiment, the description is relatively simple, with reference to the partial description of the product embodiment.

Unless defined otherwise, technical or scientific terms used in the present disclosure shall have the ordinary meaning understood by one of ordinary skill in the art to which the present disclosure belongs. As used in the present disclosure, the terms "first", "second" and the like do not denote any order, quantity, or importance, but rather are used to distinguish one element from another. The word "include" or "comprise" or the like, means that the element or article preceded by the word is inclusive of the element or article listed after the word and its equivalents, and does not exclude other elements or articles. The terms "connect", "couple" or "join" and the like are not limited to physical or mechanical connections, but may include electrical connections, whether direct or indirect. "Upper", "lower", "left", "right," etc. are used merely to denote relative positional relationships, which may change accordingly when the absolute position of the object being described changes.

It should be understood that when an element such as a layer, film, region or substrate is referred to as being "above" or "below" another element, it can be "directly" located "above" or "below" the other element or intervening elements may be present.

In the description of the embodiments above, particular features, structures, materials, or characteristics may be combined in any suitable manner in any one or more of the embodiments or examples.

The above embodiments are merely specific implementation modes of the present disclosure, but the scope of protection of the present disclosure is not limited thereto, and any modification and substitution be apparent to those skilled in the art without departing from the technical scope of the present disclosure shall covered by the scope of protection of the present disclosure. Accordingly, the scope of protection of the present disclosure is as set forth in the claims.

What is claimed is:

1. A touch substrate, comprising:
   a base;
   a plurality of electrode connecting bridges arranged on the base, wherein the plurality of electrode connecting bridges are arranged in an array form;
   a signal wiring layer arranged at a side, away from the base, of the electrode connecting bridge, wherein the signal wiring layer comprises a plurality of first signal wires and a plurality of second signal wires;
   an insulating layer arranged at a side, away from the base, of the signal wiring layer, wherein the insulating layer comprises first insulating patterns being in one-to-one correspondence with the electrode connecting bridges and a second insulating pattern completely covering the signal wiring layer; and
   a touch electrode layer arranged at a side, away from the base, of the insulating layer, wherein the touch electrode layer comprises a plurality of first touch electrodes and a plurality of second touch electrodes, and the first touch electrodes and the second touch electrodes are arranged in a crossed manner; the first signal wires are electrically connected with the first touch electrodes in a one-to-one correspondence manner, and the second signal wires are electrically connected with the second touch electrodes in a one-to-one correspondence manner; an orthographic projection of the first touch electrode onto the base and an orthographic projection of the electrode connecting bridge onto the base have a first overlapping area, and the first insulating patterns cover the first overlapping area in a one-to-one correspondence manner; each second touch electrode comprises a plurality of electrode patterns which are arranged at intervals, and adjacent electrode patterns in the plurality of electrode patterns are electrically connected through the electrode connecting bridge; and
   wherein the touch substrate further comprises:
   a plurality of binding pins, wherein a first part of binding pins in the plurality of binding pins are electrically connected with the first signal wires in a one-to-one correspondence manner, and a second part of binding pins in the binding pins are electrically connected with the second signal wires in a one-to-one correspondence manner;
   the binding pin comprises a first binding pattern, a second binding pattern and a third binding pattern which are sequentially stacked along a direction away from the base, the first binding pattern and the electrode connecting bridge are arranged on the same layer and are made of the same material, and the second binding pattern and the corresponding electrically connected first signal wire or second signal wire form an integrated structure, and the third binding pattern and the touch electrode layer are arranged on the same layer and are made of the same material.

2. The touch substrate according to claim 1, wherein, the orthographic projection of the first touch electrode onto the base and an orthographic projection of a lap joint end of the corresponding first signal wire onto the base have a second overlapping area, first through hole structures being in one-to-one correspondence with the second overlapping area are arranged on the second insulating pattern, the first through hole structure comprises a plurality of first through holes, and the first touch electrode is electrically connected with the lap joint end of the corresponding first signal wire through the plurality of first through holes in the corresponding first through hole structure; and/or,
an orthographic projection of the second touch electrode onto the base and an orthographic projection of an lap joint end of the corresponding second signal wire onto the base have a third overlapping area, second through hole structures being in one-to-one correspondence with the third overlapping area are arranged on the second insulating pattern, the second through hole structure comprises a plurality of second through holes, and the second touch electrode is electrically connected with the lap joint end of the corresponding second signal wire through the plurality of second through holes in the corresponding second through hole structure.

3. The touch substrate according to claim 2, wherein orthographic projections of the plurality of first through holes onto the base are located inside the orthographic projection of the lap joint end of the first signal wire onto the base; and/or, orthographic projections of the plurality of second through holes onto the base are located inside the orthographic projection of the lap joint end of the second signal wire onto the base.

4. The touch substrate according to claim 1, wherein the touch substrate further comprises:

a passivation layer located at a side, away from the base, of the touch electrode layer, wherein the passivation layer exposes the plurality of binding pins of the touch substrate.

5. The touch substrate according to claim 1, wherein the signal wiring layer further comprises: a signal isolation line, wherein the plurality of first signal wires are located on a first side of the signal isolation line, and the plurality of second signal wires are located on a second side of the signal isolation line.

6. A touch display device comprising the touch substrate according to claim 1.

7. The touch display device according to claim 6, wherein the touch display device further comprises a display panel, wherein the display panel comprises an array substrate and a color film substrate which are arranged oppositely, and a liquid crystal layer arranged between the array substrate and the color film substrate; and the color film substrate is reused as the base in the touch substrate.

8. The touch display device according to claim 6, wherein the touch display device further comprises a display panel, wherein the display panel and the touch substrate are stacked, and the touch electrode layer in the touch substrate is located between the display panel and the base of the touch substrate.

9. A method of forming a touch substrate, comprising:

forming a plurality of electrode connecting bridges on a base, wherein the plurality of electrode connecting bridges are arranged in an array form;

forming a signal wiring layer at a side, away from the base, of the electrode connecting bridge, wherein the signal wiring layer comprises a plurality of first signal wires and a plurality of second signal wires;

forming an insulating layer at a side, away from the base, of the signal wiring layer, wherein the insulating layer comprises first insulating patterns being in one-to-one correspondence with the electrode connecting bridges and a second insulating pattern completely covering the signal wiring layer; and forming a touch electrode layer at a side, away from the base, of the insulating layer, wherein the touch electrode layer comprises a plurality of first touch electrodes and a plurality of second touch electrodes, and the first touch electrodes and the second touch electrodes are arranged in a crossed manner; the first signal wires are electrically connected with the first touch electrodes in a one-to-one correspondence manner, and the second signal wires are electrically connected with the second touch electrodes in a one-to-one correspondence manner; an orthographic projection of the first touch electrode onto the base and an orthographic projection of the electrode connecting bridge onto the base have a first overlapping area, and the first insulating patterns cover the first overlapping areas in a one-to-one correspondence manner; each second touch electrode comprises a plurality of electrode patterns which are arranged at intervals, and adjacent electrode patterns in the plurality of electrode patterns are electrically connected through the electrode connecting bridge; and wherein the method further comprises: forming a plurality of binding pins, wherein a first part of binding pins in the plurality of binding pins are electrically connected with the first signal wires in a one-to-one correspondence manner, and a second part of binding pins in the binding pins are electrically connected with the second signal wires in a one-to-one correspondence manner; and the binding pin comprises a first binding pattern, a second binding pattern and a third binding pattern which are sequentially stacked along a direction away from the base;

the forming the plurality of binding pins specifically comprises:

simultaneously forming the first binding pattern and the electrode connecting bridges through one patterning process;

simultaneously forming the second binding pattern and the signal wiring layer of an integrated structure through one patterning process; and simultaneously forming the third binding pattern and the touch electrode layer through one patterning process.

10. The method of forming the touch substrate according to claim 9, wherein the forming the insulating layer on the side, away from the base, of the signal wiring layer specifically comprises:

forming an insulating film on the side, away from the base, of the signal wiring layer; and patterning the insulating film to form the first insulating pattern and the second insulating pattern; the orthographic projection of the first touch electrode onto the base and an orthographic projection of an lap joint end of the corresponding first signal wire onto the base have a second overlapping area, first through hole structures being in one-to-one correspondence with the second overlapping areas are arranged on the second insulating pattern, the first through hole structure comprises a plurality of first through holes, and the first touch electrode is electrically connected with the lap joint end of the corresponding first signal wire through the plurality of first through holes in the corresponding first through hole structure; an orthographic projection of the second touch electrode onto the base and an orthographic projection of an lap joint end of the corresponding second signal wire onto the base have a third overlapping area, second through hole structures being in one-to-one correspondence with the third overlapping areas are arranged on the second insulating pattern, the second through hole structure comprises a plurality of second through holes, and the second touch electrode is electrically connected with the lap joint end of the corresponding second signal wire through the plurality of second through holes in the corresponding second through hole structure.

11. The method of forming the touch substrate according claim 9, wherein the method further comprises:

forming a passivation layer at a side, away from the base, of the touch electrode layer, wherein the passivation layer exposes the plurality of binding pins of the touch substrate.

12. The method of forming the touch substrate according to claim 9, wherein the method further comprises:
   simultaneously forming a signal isolation line, the plurality of first signal wires and the plurality of second signal wires through one patterning process, wherein the plurality of first signal wires are located on a first side of the signal isolation line, and the plurality of second signal wires are located on a second side of the signal isolation line.

* * * * *